(12) United States Patent
Horikawa

(10) Patent No.: US 8,542,318 B2
(45) Date of Patent: Sep. 24, 2013

(54) IMAGE CAPTURE APPARATUS

(75) Inventor: Kouji Horikawa, Tachikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 185 days.

(21) Appl. No.: 13/218,313

(22) Filed: Aug. 25, 2011

(65) Prior Publication Data

US 2012/0050591 A1 Mar. 1, 2012

(30) Foreign Application Priority Data

Aug. 30, 2010 (JP) ................................. 2010-192391

(51) Int. Cl.
*H04N 5/225* (2006.01)

(52) U.S. Cl.
USPC ..................... 348/375; 348/207.99

(58) Field of Classification Search
USPC .................................. 348/207.99, 207.1, 375
See application file for complete search history.

(56) References Cited

FOREIGN PATENT DOCUMENTS

JP 10-069339 A 3/1998

*Primary Examiner* — Gevell Selby
(74) *Attorney, Agent, or Firm* — Canon U.S.A., Inc. IP Division

(57) ABSTRACT

An image capture apparatus includes a connector, a first terminal resistor having a first resistance value, a second terminal resistor having a second resistance value which is smaller than the first resistance value, and a connection unit. The connection unit is configured (a) to disconnect the second terminal resistor from the connector if a time code signal is input to the connector, and (b) to connect the second terminal resistor to the connector if an external synchronization signal is input to the connector.

17 Claims, 8 Drawing Sheets

IMAGE CAPTURE APPARATUS

BACKGROUND OF THE INVENTION

1. Field of the Invention

The present invention relates to an image capture apparatus having a connector configured to allow input of a time code signal and an external synchronization signal (e.g., a Genlock signal) thereto.

2. Description of the Related Art

Image capture apparatuses such as digital video camera each have a plurality of connectors to be fit in a variety of uses. For example, an image capture apparatus that inputs a time code signal has an input connector configured to allow input of only the time code signal, and an image capture apparatus that inputs an external synchronization signal such as a Generator Lock (Genlock) signal has an input connector configured to allow input of only the external synchronization signal. An image capture apparatus that outputs a time code signal has an output connector configured to allow output of only the time code signal.

A plurality of connectors provided in an image capture apparatus hinders downsizing and cost reduction of the apparatus. Mere reduction in the number of connectors, however, does not result in offering of image capture apparatuses fitting in a variety of uses.

Thus, there is a need for a method of reducing the number of connectors in an image capture apparatus while maintaining the ability of the apparatus to fit in a variety of uses. Japanese Patent Application Laid-Open No. 10-69339 discusses a use of one common connector in place of a plurality of connectors for input/output interfaces.

The one connector useful for a plurality of different uses leads to offering, to users, of an image capture apparatus that has a wide range of uses and also achieves downsizing and cost reduction.

Unfortunately, there has been no image capture apparatus known to have a connector that inputs both of a time code signal and an external synchronization signal.

In addition, there has been no image capture apparatus known to have a connector that inputs both of a time code signal and an external synchronization signal and outputs a time code signal.

SUMMARY OF THE INVENTION

The present invention is directed to an image capture apparatus having a connector configured to allow input of a time code signal and an external synchronization signal (e.g., a Genlock signal). The present invention is also directed to an image capture apparatus having a connector configured to allow input of a time code signal and an external synchronization signal (e.g., a Genlock signal) and to allow output of the time code signal. The present invention is also directed to overcome the above-described drawbacks and/or disadvantages.

According to an aspect of the present invention, an image capture apparatus includes a connector, a first terminal resistor having a first resistance value, a second terminal resistor having a second resistance value which is smaller than the first resistance value, and a connection unit. The connection unit is configured (a) to disconnect the second terminal resistor from the connector if a time code signal is input to the connector, and (b) to connect the second terminal resistor to the connector if an external synchronization signal is input to the connector.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the present invention and, together with the description, serve to explain the principles of the present invention.

DESCRIPTION OF THE EMBODIMENTS

Various exemplary embodiments, features, and aspects of the present invention will be described in detail below with reference to the drawings.

First Exemplary Embodiment

Figure 1:
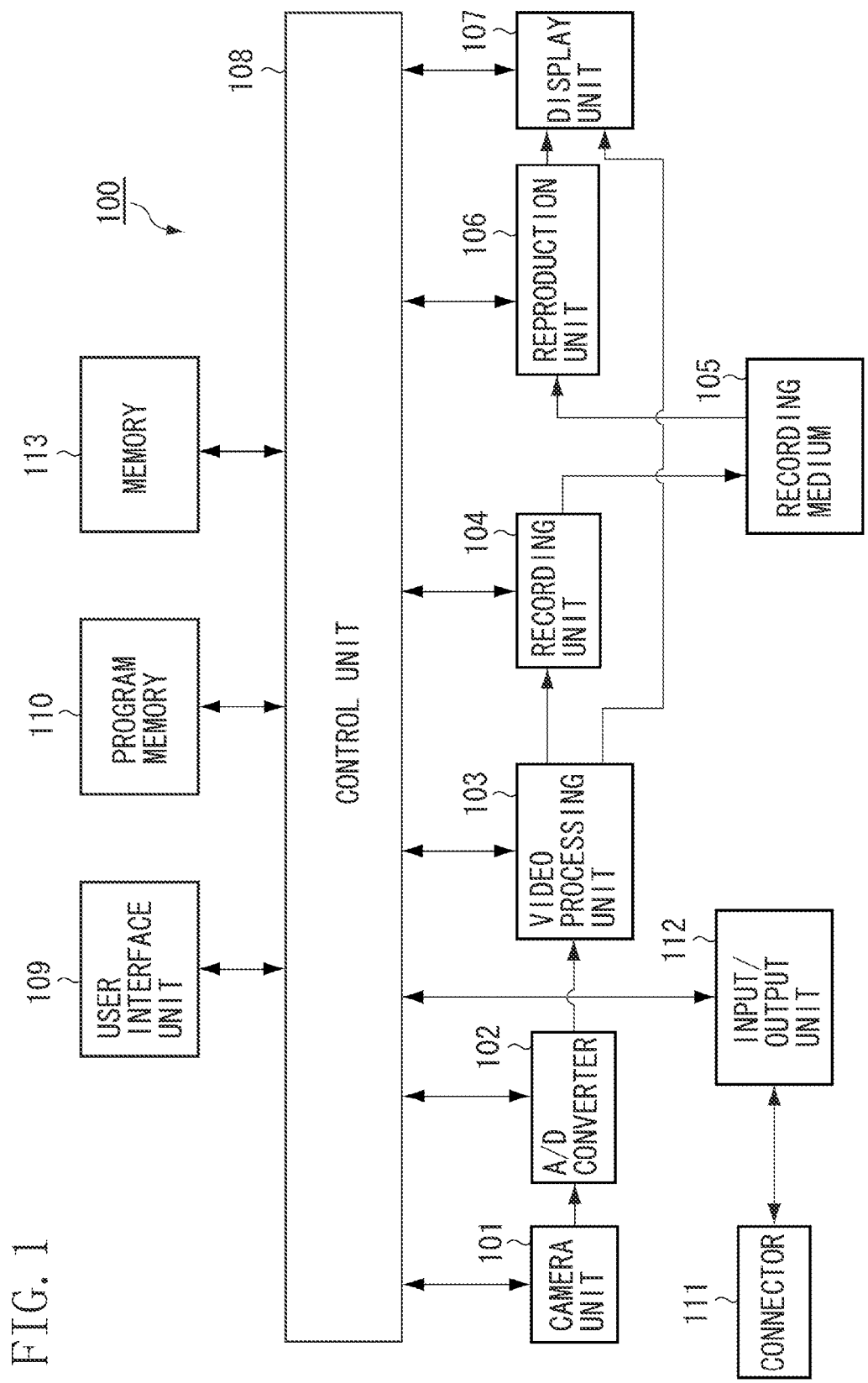
FIG. 1 is a block diagram illustrating components of an image capture apparatus according to first to third exemplary embodiments of the present invention.

FIG. 1 is a block diagram illustrating components of an image capture apparatus 100 according to first to third exemplary embodiments of the present invention.

In the first to third exemplary embodiments, the image capture apparatus 100 is a digital video camera, but may be another apparatus. For example, the image capture apparatus 100 may be a digital camera, a mobile phone, or a mobile terminal.

The image capture apparatus 100 includes, as illustrated in FIG. 1, a camera unit 101, an A/D converter 102, a video processing unit 103, a recording unit 104, a recording medium 105, a reproduction unit 106, a display unit 107, and a control unit 108. The image capture apparatus 100 further includes, as illustrated in FIG. 1, a user interface unit 109, a program memory 110, a connector 111, an input/output unit 112, and a memory 113.

The camera unit 101 includes a lens unit, and an image sensor to receive an optical image input through the lens unit. The camera unit 101 generates a video signal corresponding to the optical image received by the image sensor. The video signal generated by the camera unit 101 is supplied to the A/D converter 102. The lens unit includes a zoom lens to define a range of a scene to be shot, a focus lens to adjust a focus, and an iris mechanism to adjust the luminance of a video signal.

The A/D converter 102 converts the video signal generated by the camera unit 101 into a digital video signal. The digital video signal converted by the A/D converter 102 is supplied to the video processing unit 103.

The video processing unit 103 generates video data in a predetermined format from the digital video signal converted by the A/D converter 102. The video processing unit 103 adjusts the color tone and image size for the video data, and also applies special effect to the video data. The video data generated by the video processing unit 103 may be moving image data or still image data. The video data generated by the video processing unit 103 may be provided with audio data. In any case, the video data generated by the video processing unit 103 is supplied to the recording unit 104. The video processing unit 103 also generates video data for display from the digital video signal converted by the A/D converter 102. The video data for display is supplied from the video processing unit 103 to the display unit 107.

The recording unit 104 codes the video data generated by the video processing unit 103, and records the coded video data on the recording medium 105. The video data to be recorded on the recording medium 105 may be coded in any coding scheme. Thus, the recording unit 104 supports a variety of coding schemes. If video data to be recorded on the recording medium 105 is still image data, the recording unit 104 may use a coding scheme such as JPEG (Joint Photographic Experts Group). If video data to be recorded on the recording medium 105 is moving image data, the recording unit 104 may use a coding scheme such as MPEG-2 (Moving Picture Experts Group 2), MPEG-4 (Moving Picture Experts Group 4), and H.264.

The recording medium 105 may be a semiconductor memory, a hard disk device, or a memory card, for example. In the first exemplary embodiment, the recording medium 105 is removable from the image capture apparatus 100, but may not be removable. The reproduction unit 106 reproduces the video data such as moving image data or still image data from the recording medium 105, and decodes the reproduced video data. The video data decoded by the reproduction unit 106 is supplied to the display unit 107.

The display unit 107 includes a display device such as a liquid crystal display device. If the image capture apparatus 100 is operating in a moving image reproduction mode or a still image reproduction mode, the display unit 107 displays the video data decoded by the reproduction unit 106 on the display device. If the image capture apparatus 100 is operating in a moving image shooting mode or a still image shooting mode, the display unit 107 displays the video data for display decoded by the video processing unit 103 on the display device.

The control unit 108 includes a memory and a central processing unit (CPU). The control unit 108 controls the image capture apparatus 100 according to various programs stored in the program memory 110. The program memory 110 stores various programs to control the image capture apparatus 100. The control unit 108 also performs system control in response to the operation modes of the image capture apparatus 100. The operation modes of the image capture apparatus 100 include a moving image shooting mode for shooting moving images, a still image shooting mode for shooting still images, a moving image reproduction mode for reproducing moving images recorded in the recording medium 105, and a still image reproduction mode for reproducing still images recorded in the recording medium 105.

The user interface unit 109 has switches to accept instructions from a user to the control unit 108. The switches at least include a power source switch, a shutter switch, a recording (Rec) switch, a recording-pause (RecPause) switch, a selection switch, a setting switch, a cross (arrow) switch, and an input/output mode changeover switch. The input/output mode changeover switch is used to change the current mode of the connector 111 to an input mode or an output mode. The selection switch, the setting switch, and the cross switch are used to operate a menu screen and a setting screen, for example. These screens including the menu screen of the image capture apparatus 100 is stored in the program memory 110. In the first exemplary embodiment, the user interface unit 109 may be entirely configured with software. Alternatively, the user interface unit 109 may be configured with a touch panel.

The connector 111 can serve as an input connector and an output connector. The connector 111 may be configured as a Bayonet Neill Concelman (BNC) connector, for example.

While the connector 111 is in the input mode, the connector 111 can accept both of a time code signal and a Genlock signal from an external apparatus. In other words, the connector 111 in the input mode is able to serve as a time code input connector and as a Genlock input connector.

While the connector 111 is in the output mode, the connector 111 can output a time code signal generated by the control unit 108 to an external time code input apparatus. In other words, the connector 111 in the output mode is able to serve as a time code output connector.

The time code signal in the first to third exemplary embodiments is used to generate time codes for video signals. In the first to third exemplary embodiments, for example, a time code signal conformed to SMPTE (Society of Motion Picture and Television Engineers) 12M is used. Accordingly, the time code signal used in the first to third exemplary embodiments includes a signal conformed to SMPTE 12M, for example. The Genlock signal used in the first to third exemplary embodiments is an external synchronization signal (or external reference signal) used to synchronize a video signal generated by the image capture apparatus 100 with a video signal generated by an external synchronization signal generation apparatus. Accordingly, the Genlock signal used in the first to third exemplary embodiments is an example of the external synchronization signal (or external reference signal). The external synchronization signal (or external reference signal) used in the first to third exemplary embodiments includes a Genlock signal. The external synchronization signal (or external reference signal) used in the first to third exemplary embodiments is used to synchronize a video signal generated by the image capture apparatus 100 with a video signal generated by an external synchronization signal generation apparatus.

If the connector 111 is in the input mode and a time code signal is input to the connector 111 from an external apparatus, the input/output unit 112 can generate a time code using the time code signal. The time code generated by the input/output unit 112 is supplied to the control unit 108.

If the connector 111 is in the input mode and a Genlock signal is input to the connector 111 from an external apparatus, the input/output unit 112 can generate an external synchronization signal using the Genlock signal. The external synchronization signal generated by the input/output unit 112 is supplied to the camera unit 101, the A/D converter 102, the video processing unit 103, the recording unit 104, and the control unit 108.

If the connector 111 is in the output mode, the input/output unit 112 generates a time code signal using the time code generated by the control unit 108. The time code signal generated by the input/output unit 112 is output from the connector 111 to an external time code input apparatus.

The memory 113 includes a non-volatile memory, and stores various setting information about the image capture apparatus 100. The setting information about the image capture apparatus 100 contains connector mode information. The connector mode information indicates the current mode of the connector 111. In the initial state, the connector 111 is set to be in the input mode, for example.

Figure 2:
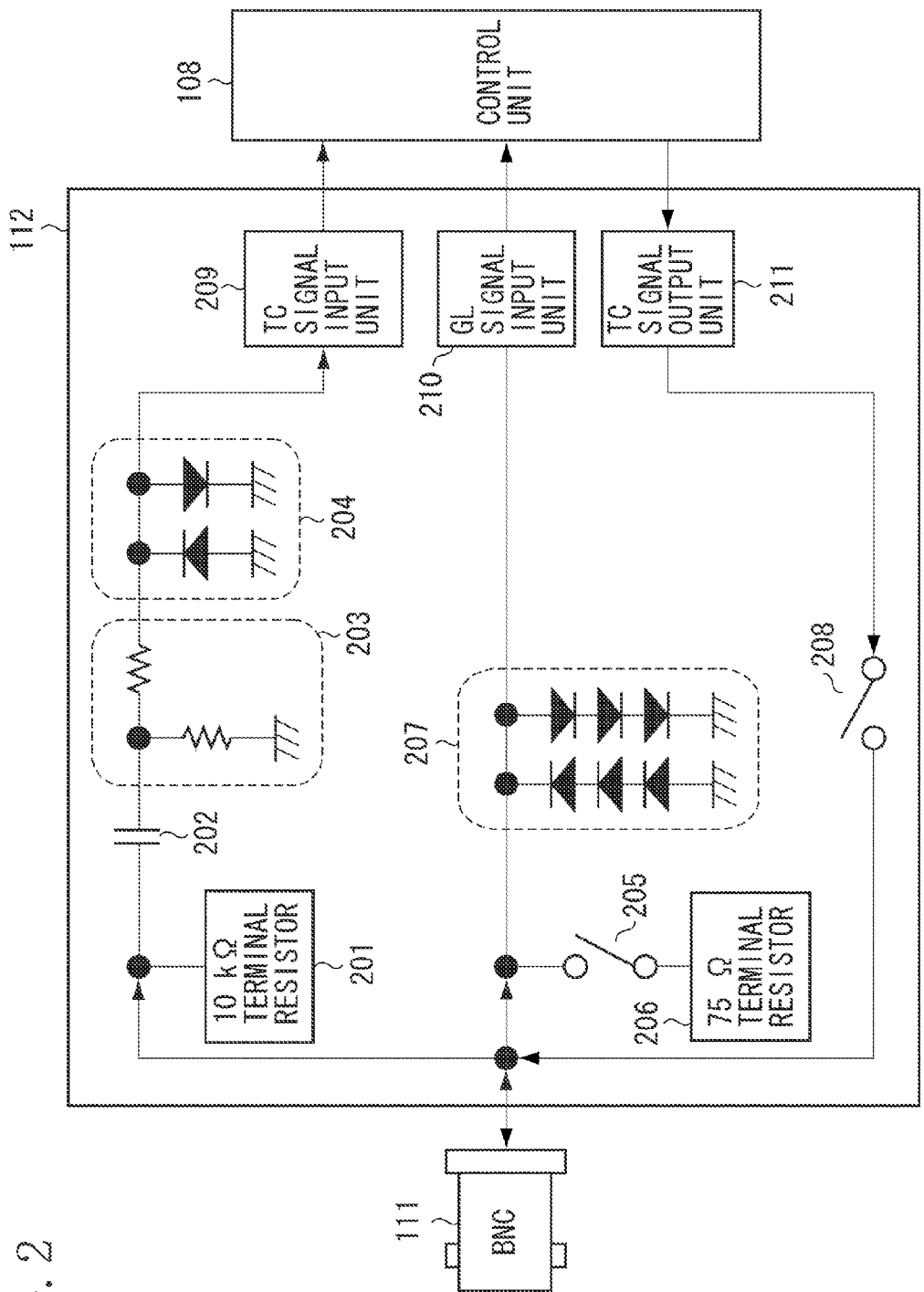
FIG. 2 illustrates components of an input/output unit according to the first exemplary embodiment.

FIG. 2 illustrates components of the input/output unit 112 according to the first exemplary embodiment.

The input/output unit 112 according to the first exemplary embodiment includes, as illustrated in FIG. 2, a 10 kΩ terminal resistor 201, a capacitor 202, a resistor unit 203, and a first amplitude limiter circuit 204. The input/output unit 112 according to the first exemplary embodiment further includes, as illustrated in FIG. 2, a 75Ω terminal switch 205, a 75Ω terminal resistor 206, a second amplitude limiter circuit 207, a time code (TC) output switch 208, a time code (TC) signal input unit 209, a Genlock (GL) signal input unit 210, and a time code (TC) signal output unit 211.

The 10 kΩ terminal resistor 201 is a terminal resistor for time code signals. The 75Ω terminal resistor 206 is a terminal resistor for Genlock signals, and is smaller in resistance value than the 10 kΩ terminal resistor 201. The 10 kΩ terminal resistor 201 is a first terminal resistor having a first resistance value, and the 75Ω terminal resistor 206 is a second terminal resistor having a second resistance value which is smaller than the first resistance value.

The 75Ω terminal switch 205 controls a connection of the 75Ω terminal resistor 206. If the 75Ω terminal switch 205 is turned on, the 75Ω terminal switch 205 connects the 75Ω terminal resistor 206 to the connector 111. While the 75Ω terminal switch 205 is ON, the 75Ω terminal resistor 206 is connected to the connector 111. If the 75Ω terminal switch 205 is turned off, the 75Ω terminal switch 205 separates the 75Ω terminal resistor 206 from the connector 111. While the 75Ω terminal switch 205 is OFF, the 75Ω terminal resistor 206 is disconnected from the connector 111. The 75Ω terminal switch 205 operates as a first connection unit.

The TC output switch 208 serves to connect the TC signal output unit 211 to the connector 111. If the connector 111 is in the output mode, the TC output switch 208 is turned on by the control unit 108. If the connector 111 is in the input mode, the TC output switch 208 is turned off by the control unit 108.

If the connector 111 is in the output mode, the TC signal output unit 211 generates a time code signal using the time code generated by the control unit 108. The time code signal generated by the TC signal output unit 211 is supplied to the connector 111 via the TC output switch 208. As a result, the time code signal generated by the TC signal output unit 211 is supplied to an external time code input apparatus via the connector 111 and the TC output switch 208. The TC signal output unit 211 operates as a time code signal generating unit.

If the connector 111 is in the input mode and the TC output switch 208 and the 75Ω terminal switch 205 are turned off, an input signal from an external apparatus to the connector 111 is input to the capacitor 202. The capacitor 202 operates as an alternating-current (AC) coupling capacitor for the input signal input to the connector 111. This allows only an alternating current component of the input signal to be supplied to the resistor unit 203. The resistor unit 203 fixes the potential of the alternating current component of the input signal. The first amplitude limiter circuit 204 causes an amplitude limit, which is separated by the resistor unit 203. Accordingly, the amplitude limit of the first amplitude limiter circuit 204 does not impart any effect on the amplitude of the Genlock signal input to the connector 111 from an external synchronization signal generation apparatus.

The first amplitude limiter circuit 204 limits an amplitude of the supplied signal exceeding a first amplitude to the first amplitude to protect the TC signal input unit 209. In this way, the first amplitude limiter circuit 204 protects the TC signal input unit 209 from a time code signal having an excessive amplitude. The alternating current component of an input signal is input to the TC signal input unit 209 via the first amplitude limiter circuit 204. The TC signal input unit 209 checks the voltage of an input signal, after the process at the first amplitude limiter circuit 204, for a predetermined period of time, to automatically determine a type of the input signal input to the connector 111. If it is determined that no time code signal or no Genlock signal is input to the connector 111, the GL signal input unit 210 notifies the absence to the control unit 108.

If the connector 111 is in the input mode and the input signal input to the connector 111 from an external apparatus is a time code signal, the TC signal input unit 209 is able to generate a time code using the time code signal. The time code generated by the TC signal input unit 209 is supplied to the control unit 108.

If the connector 111 is in the input mode and the input signal input to the connector 111 from an external apparatus is a Genlock signal, the 75Ω terminal switch 205 is turned on by the control unit 108. If the 75Ω terminal switch 205 is turned on, the Genlock signal input to the connector 111 is supplied to the second amplitude limiter circuit 207.

The second amplitude limiter circuit 207 limits an amplitude of the supplied signal exceeding a second amplitude to the second amplitude to protect the GL signal input unit 210. The second amplitude is set to be larger than the first amplitude not to deform the waveform of the Genlock signal. The Genlock signal input to the connector 111 is supplied to the GL signal input unit 210 via the second amplitude limiter circuit 207.

If the connector 111 is in the input mode and the input signal input to the connector 111 from an external apparatus is a Genlock signal, the GL signal input unit 210 is able to generate an external synchronization signal using the Genlock signal. The external synchronization signal generated by the GL signal input unit 210 is supplied to the camera unit 101, the A/D converter 102, the video processing unit 103, the recording unit 104, and the control unit 108.

Figure 3:
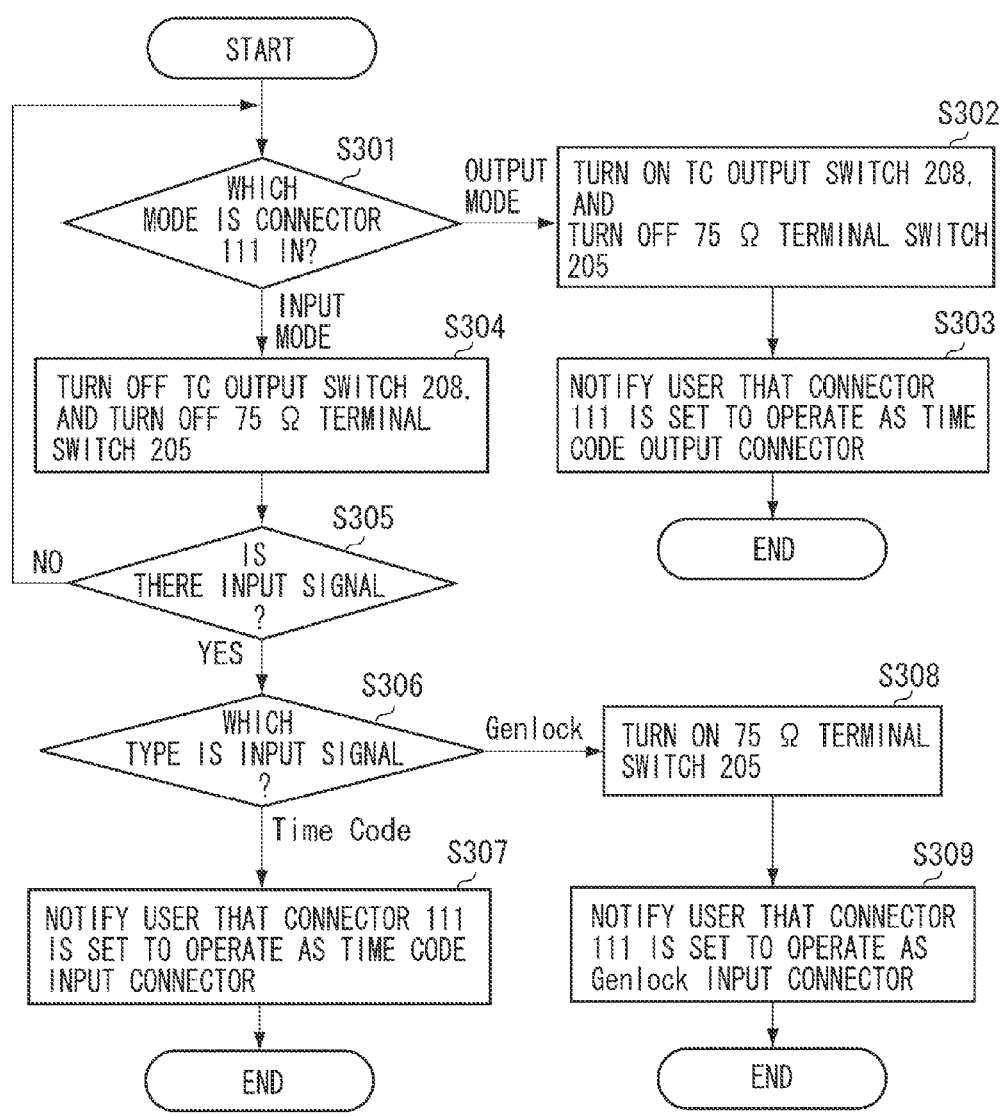
FIG. 3 is a flowchart illustrating an input/output control process performed in the image capture apparatus according to the first exemplary embodiment.

FIG. 3 is a flowchart illustrating an input/output control process performed in the image capture apparatus 100 according to the first exemplary embodiment. The input/output control process starts when the image capture apparatus 100 is turned on. Alternatively, the input/output control process starts when the connector 111 is updated to the input mode or the output mode. The input/output control process is controlled by the control unit 108. The program executed by the control unit 108 to control the input/output control process is stored in the program memory 110.

In step S301, the control unit 108 obtains connector mode information of the connector 111 from the memory 113, to check the current mode of the connector 111. The connector mode information indicates the current mode of the connector 111. If the connector mode information indicates that the connector 111 is in the output mode, the control unit 108 proceeds to step S302. If the connector mode information indicates that the connector 111 is in the input mode, the control unit 108 proceeds to step S304.

In step S302, the control unit 108 turns on the TC output switch 208 and turns off the 75Ω terminal switch 205. This makes the connector 111 ready to output a time code signal. In other words, the connector 111 is set to operate as a time code output connector. While the 75Ω terminal switch 205 is OFF, the connector 111 remains disconnected from the 75Ω terminal resistor 206. If the TC output switch 208 is turned on and the 75Ω terminal switch 205 is turned off, the control unit 108 proceeds from step S302 to step S303.

The time code generated by the control unit 108 while the connector 111 is in the output mode is supplied from the control unit 108 to the TC signal output unit 211. The TC signal output unit 211 generates a time code signal using the time code generated by the control unit 108. The time code signal generated by the TC signal output unit 211 is supplied to the connector 111 via the TC output switch 208. As a result, the time code signal generated by the TC signal output unit 211 is supplied to an external time code input apparatus via the TC output switch 208 and the connector 111.

In step S303, the control unit 108 causes the display unit 107 to display information A1 for notifying a user that the connector 111 is set to operate as a time code output connector. The information A1 indicates that the connector 111 can operate as a connector to output a time code signal. The notification allows the user to know that the connector 111 is set to operate as a time code output connector. The information A1 includes at least one of image, voice, icon, and message. If the information A1 is displayed on the display unit 107, the flowchart ends.

In step S304, the control unit 108 turns off the TC output switch 208 and the 75Ω terminal switch 205. This makes the connector 111 ready to accept both of a time code signal and a Genlock signal. In other words, while the TC output switch 208 and the 75Ω terminal switch 205 are OFF, the connector 111 is set to operate as a time code input connector and also as a Genlock input connector. While the 75Ω terminal switch 205 is OFF, the connector 111 remains disconnected from the 75Ω terminal resistor 206. If the TC output switch 208 and the 75Ω terminal switch 205 are turned off, the control unit 108 proceeds from step S304 to step S305.

In step S305, the control unit 108 determines whether the connector 111 has received an input signal. If the control unit 108 determines the connector 111 has received an input signal (YES in step S305), the control unit 108 proceeds to step S306. If the control unit 108 determines the connector 111 has not received an input signal (NO in step S305), the control unit 108 returns to step S301.

The input signal received by the connector 111 while the TC output switch 208 and the 75Ω terminal switch 205 are OFF is supplied via the capacitor 202 and the resistor unit 203 to the first amplitude limiter circuit 204, and is processed there. The processed signal is input to the TC signal input unit 209. The TC signal input unit 209 checks the voltage of the input signal for a predetermined period of time to determine the type of the input signal. After the determination of the type, the TC signal input unit 209 supplies the type information of the input signal to the control unit 108. The information indicates whether the input signal received by the connector 111 is a time code signal or a Genlock signal.

In step S306, the control unit 108 checks the type information of the input signal supplied from the TC signal input unit 209, and determines the type of the input signal input from the external apparatus to the connector 111. If the input signal is determined to be a time code signal, the control unit 108 proceeds to step S307. If the input signal is determined to be a Genlock signal, the control unit 108 proceeds to step S308.

If the input signal input from an external apparatus to the connector 111 is a time code signal, the TC signal input unit 209 generates a time code using the input signal supplied from the first amplitude limiter circuit 204. The time code generated by the TC signal input unit 209 is supplied to the control unit 108. The control unit 108 performs control such that the time code generated by the TC signal input unit 209 is added to the video signal generated by the image capture apparatus 100. Consequently, the time code generated by the external apparatus is added to the video signal generated by the image capture apparatus 100, and is then recorded on the recording medium 105.

In step S307, the control unit 108 causes the display unit 107 to display information A2 for notifying a user that the connector 111 is set to operate as a time code input connector. The notification allows the user to know that the connector 111 is set to operate as a time code input connector. The information A2 is information for notifying a user that the connector 111 can operate as a connector to input a time code signal. The information A2 includes at least one of image, voice, icon, and message. In step S307, both of the TC output switch 208 and the 75Ω terminal switch 205 are turned off. If the information A2 is displayed on the display unit 107, the flowchart ends.

In step S308, the control unit 108 turns on the 75Ω terminal switch 205. This makes the Genlock signal input to the connector 111 ready to be supplied to the GL signal input unit 210. In other words, the connector 111 is set to operate as a Genlock input connector. While the 75Ω terminal switch 205 is ON, the connector 111 remains connected to the 75Ω terminal resistor 206. If the 75Ω terminal switch 205 is turned on, the control unit 108 proceeds from step S308 to step S309.

If the input signal input to the connector 111 from an external apparatus is a Genlock signal, the GL signal input unit 210 generates an external synchronization signal using the input signal supplied from the second amplitude limiter circuit 207. The external synchronization signal generated by the GL signal input unit 210 is supplied to the camera unit 101, the A/D converter 102, the video processing unit 103, the recording unit 104, and the control unit 108. The control unit 108 controls the camera unit 101, the A/D converter 102, the video processing unit 103, and the recording unit 104, according to the external synchronization signal generated by the TC signal input unit 209. As a result, the image capture apparatus 100 is able to generate a video signal synchronized with the external synchronization signal generated by the external apparatus, and to record the video signal on the recording medium 105.

In step S309, the control unit 108 causes the display unit 107 to display information A3 for notifying a user that the connector 111 is set to operate as a Genlock input connector. The notification allows the user to know that the connector 111 is set to operate as a Genlock input connector. The information A3 is information for notifying a user that the connector 111 can operate as a connector to input an external synchronization signal (e.g., a Genlock signal). The information A3 includes at least one of image, voice, icon, and message. If the information A3 is displayed on the display unit 107, the flowchart ends.

Figure 4:
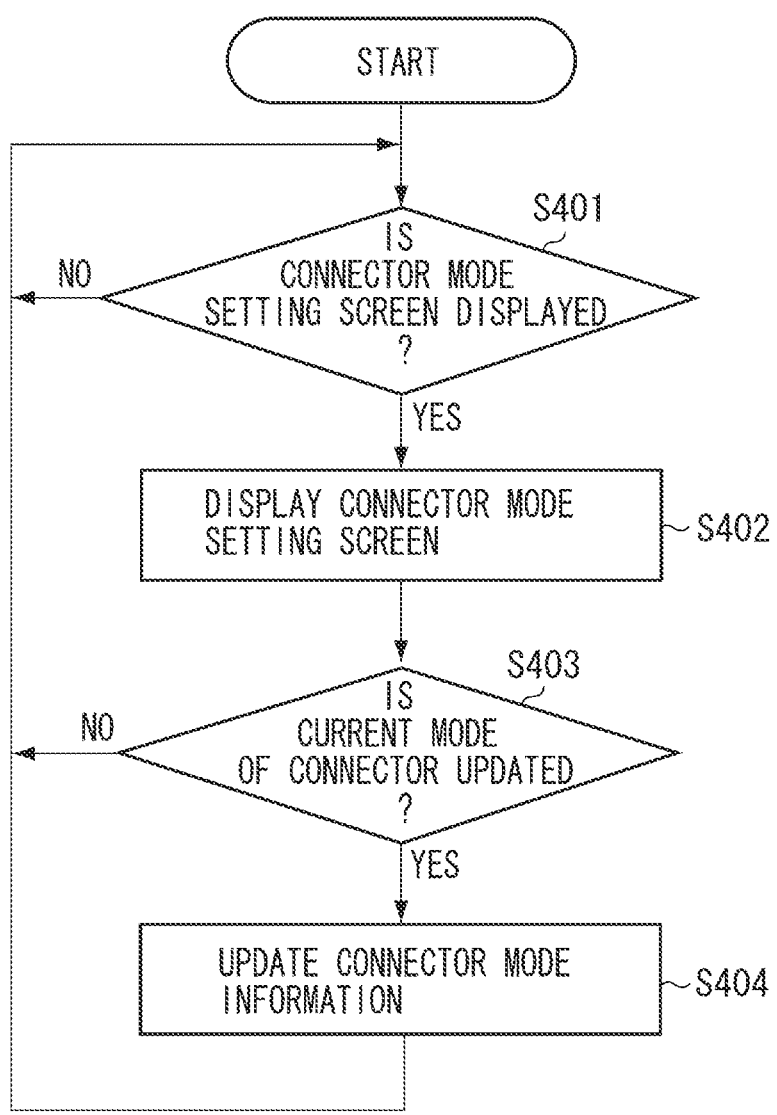
FIG. 4 is a flowchart illustrating a connector mode update process performed in the image capture apparatus according to the first to third exemplary embodiments.

FIG. 4 is a flowchart illustrating a connector mode update process performed in the image capture apparatus 100 according to the first to third exemplary embodiments. The connector mode update process starts when the image capture apparatus 100 is turned on. The connector mode update process is controlled by the control unit 108. The program executed by the control unit 108 to control the connector mode update process is stored in the program memory 110.

In step S401, the control unit 108 determines whether a first instruction is input to the control unit 108 to display a connector mode setting screen. A user can input the first instruction to the control unit 108 by operating the user interface unit 109. The connector mode setting screen is a graphical user interface (GUI) screen used to update the current mode of the connector 111 to the output mode or the input mode. A user can use the user interface unit 109 to operate the connector mode setting screen. The connector mode setting screen is stored in the program memory 110.

If the first instruction is input to the control unit 108 (YES in step S401), the control unit 108 proceeds to step S402. If the first instruction is not input to the control unit 108 (NO in step S401), the control unit 108 returns to step S401.

In step S402, the control unit 108 causes the display unit 107 to display the connector mode setting screen.

In step S403, the control unit 108 determines whether the current mode of the connector 111 is updated to the input mode or the output mode. A user can input a second instruction to the control unit 108 to update the mode of the connector 111 to the output mode or the input mode by operating the connector mode setting screen.

If the current mode of the connector 111 is updated to the input mode or the output mode (YES in step S403), the control unit 108 proceeds to step S404. If the current mode of the connector 111 is not updated to the input mode or the output mode (NO in step S403), the control unit 108 returns to step S401.

In step S404, the control unit 108 updates the connector mode information stored in the memory 113, according to the second instruction. After the connector mode information stored in the memory 113 is updated, the control unit 108 returns to step S401.

As described above, the image capture apparatus 100 according to the first exemplary embodiment is able to use one connector therein as one of a time code output connector, a time code input connector, and a Genlock input connector. The structure leads to further downsizing and cost reduction of the image capture apparatus 100. The structure also enables the image capture apparatus 100 to fit in a wide range of uses.

The image capture apparatus 100 according to the first exemplary embodiment automatically determines the type of an input signal to cause one connector to operate as a time code input connector or a Genlock input connector. This improves usability of the connector 111.

The input/output unit 112 according to the first exemplary embodiment is not limited to that illustrated in FIG. 2. For example, the input/output unit 112 may be configured without the capacitor 202, the resistor unit 203, the first amplitude limiter circuit 204, and the second amplitude limiter circuit 207. The connector 111 according to the first exemplary embodiment may be configured to operate only as an input connector.

Second Exemplary Embodiment

A second exemplary embodiment is described with reference to FIGS. 1 and 2 and FIGS. 5 and 6. The second exemplary embodiment differs from the first exemplary embodiment in the input/output unit 112 as follows. The other parts of the second exemplary embodiment are similar to those of the first exemplary embodiment, and therefore the detail descriptions thereof will not be repeated.

The image capture apparatus 100 according to the second exemplary embodiment has the components illustrated in FIG. 1, and therefore the detail descriptions of these components will not be repeated.

Figure 5:
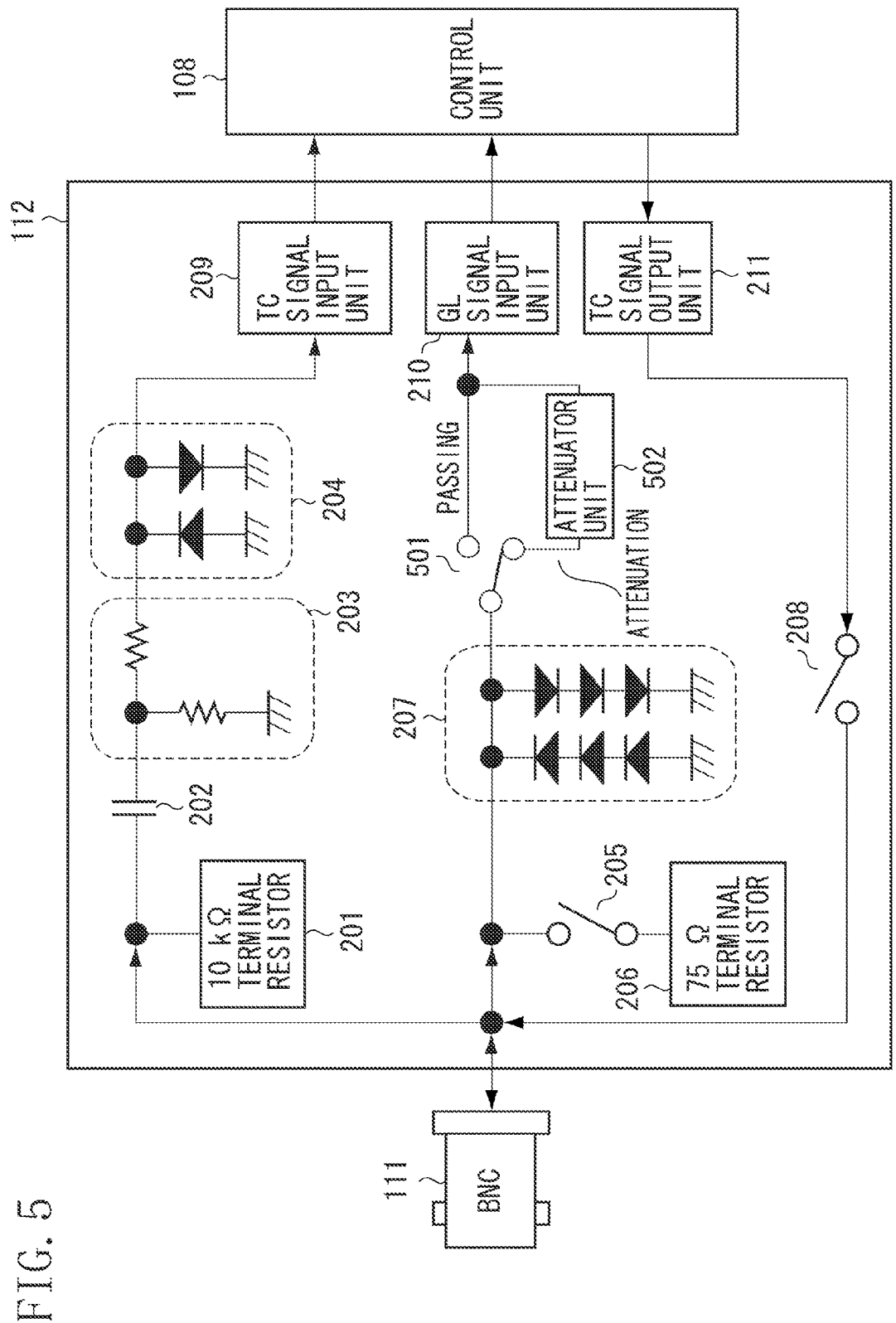
FIG. 5 illustrates components of the input/output unit according to the second exemplary embodiment.

FIG. 5 illustrates the components of the input/output unit 112 according to the second exemplary embodiment. In FIG. 5, the components similar to those in FIG. 2 are designated with the same reference numerals as those in FIG. 2, and therefore the detail descriptions of these components will not be repeated.

The input/output unit 112 according to the second exemplary embodiment includes a 10 k$\Omega$ terminal resistor 201, a capacitor 202, a resistor unit 203, and a first amplitude limiter circuit 204, as illustrated in FIG. 5. The input/output unit 112 according to the second exemplary embodiment further includes a 75$\Omega$ terminal switch 205, a 75$\Omega$ terminal resistor 206, a second amplitude limiter circuit 207, a TC output switch 208, a TC signal input unit 209, a GL signal input unit 210, a TC signal output unit 211, an attenuation (ATT) switch 501, and an attenuator unit 502, as illustrated in FIG. 5.

The attenuation (ATT) switch 501 is used to select one of an attenuation side and a passing side. If the ATT switch 501 selects the attenuation side, the second amplitude limiter circuit 207 is connected to the attenuator unit 502. If the ATT switch 501 selects the passing side, the second amplitude limiter circuit 207 is connected to the GL signal input unit 210.

The attenuator unit 502 includes an attenuator to attenuate the amplitude of a Genlock signal to equal to or less than a predetermined level. The amplitude of the Genlock signal is appropriately adjusted by the attenuator unit 502.

Figure 6:
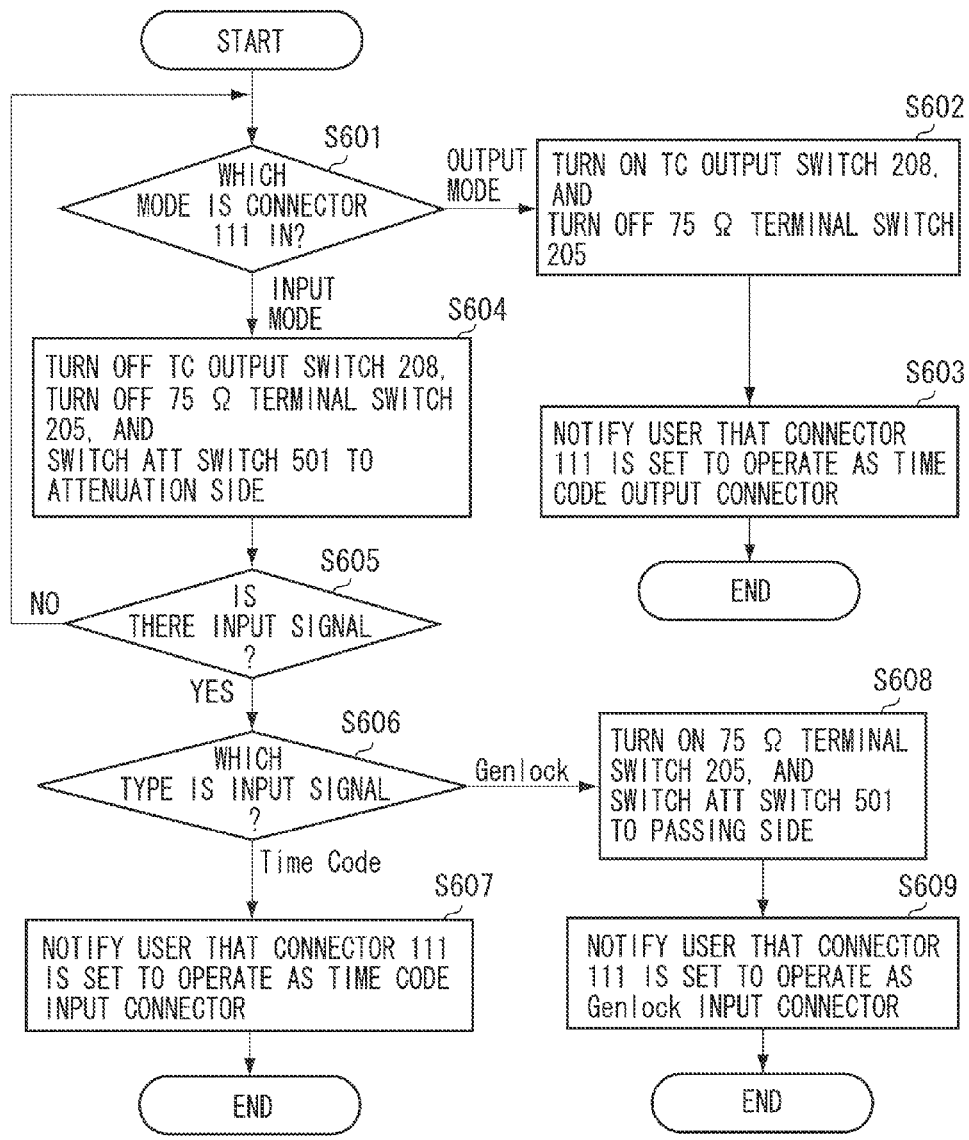
FIG. 6 is a flowchart illustrating an input/output control process performed in the image capture apparatus according to the second exemplary embodiment.

FIG. 6 is a flowchart illustrating an input/output control process performed in the image capture apparatus 100 according to the second exemplary embodiment. The input/output control process starts when the image capture apparatus 100 is turned on. Alternatively, the input/output control process starts when the connector 111 is updated to the input mode or the output mode. The input/output control process is controlled by the control unit 108. The program executed by the control unit 108 to control the input/output control process is stored in the program memory 110.

In step S601, the control unit 108 obtains connector mode information of the connector 111 from the memory 113, to check the current mode of the connector 111. The connector mode information indicates the current mode of the connector 111. If the connector mode information indicates that the connector 111 is in the output mode, the control unit 108 proceeds to step S602. If the connector mode information indicates that the connector 111 is in the input mode, the control unit 108 proceeds to step S604.

In step S602, the control unit 108 turns on the TC output switch 208 and turns off the 75$\Omega$ terminal switch 205. This makes the connector 111 ready to output a time code signal. In other words, the connector 111 is set to operate as a time code output connector. While the 75$\Omega$ terminal switch 205 is OFF, the connector 111 remains disconnected from the 75$\Omega$ terminal resistor 206. If the TC output switch 208 is turned on and the 75$\Omega$ terminal switch 205 is turned off, the control unit 108 proceeds from step S602 to step S603.

The time code generated by the control unit 108 while the connector 111 is in the output mode is supplied from the control unit 108 to the TC signal output unit 211. The TC signal output unit 211 generates a time code signal using the time code generated by the control unit 108. The time code signal generated by the TC signal output unit 211 is supplied to an external time code input apparatus via the TC output switch 208 and the connector 111.

In step S603, the control unit 108 causes the display unit 107 to display information A1 for notifying a user that the connector 111 is set to operate as a time code output connector. The information A1 indicates that the connector 111 can operate as a connector to output a time code signal. The notification allows the user to know that the connector 111 is set to operate as a time code output connector. The information A1 includes at least one of image, voice, icon, and message. If the information A1 is displayed on the display unit 107, the flowchart ends.

In step S604, the control unit 108 turns off the TC output switch 208 and the 75Ω terminal switch 205 and causes the ATT switch 501 to select the attenuation side. This makes the connector 111 ready to accept both of a time code signal and a Genlock signal from an external apparatus. In other words, while the TC output switch 208 and the 75Ω terminal switch 205 are OFF, the connector 111 is able to operate as a time code input connector and also as a Genlock input connector. While the 75Ω terminal switch 205 is OFF, the connector 111 remains disconnected from the 75Ω terminal resistor 206. If the TC output switch 208 and the 75Ω terminal switch 205 are turned off and the ATT switch 501 selects the attenuation side, the control unit 108 proceeds from step S604 to step S605.

In step S605, the control unit 108 determines whether the connector 111 has received an input signal. If the control unit 108 determines the connector 111 has received an input signal (YES in step S605), the control unit 108 proceeds to step S606. If the control unit 108 determines the connector 111 has not received an input signal (NO in step S605), the control unit 108 returns to step S601.

The input signal received by the connector 111 while the TC output switch 208 and the 75Ω terminal switch 205 are OFF is supplied via the capacitor 202 and the resistor unit 203 to the first amplitude limiter circuit 204, and is processed there. The processed signal is input to the TC signal input unit 209. The TC signal input unit 209 checks the voltage of the input signal for a predetermined period of time to determine the type of the input signal. After the determination of the type, the TC signal input unit 209 supplies the type information of the input signal to the control unit 108. The information indicates whether the input signal received by the connector 111 is a time code signal or a Genlock signal.

In step S606, the control unit 108 checks the type information of the input signal supplied from the TC signal input unit 209, and determines the type of the input signal input from the external apparatus to the connector 111. If the input signal is determined to be a time code signal, the control unit 108 proceeds to step S607. If the input signal is determined to be a Genlock signal, the control unit 108 proceeds to step S608.

If the input signal input from an external apparatus to the connector 111 is a time code signal, the TC signal input unit 209 generates a time code using the input signal supplied from the first amplitude limiter circuit 204. The time code generated by the TC signal input unit 209 is supplied to the control unit 108. The control unit 108 performs control such that the time code generated by the TC signal input unit 209 is added to the video signal generated by the image capture apparatus 100. Consequently, the time code generated by the external apparatus is added to the video signal generated by the image capture apparatus 100, and is then recorded on the recording medium 105.

In step S607, the control unit 108 causes the display unit 107 to display information A2 for notifying a user that the connector 111 is set to operate as a time code input connector. The notification allows the user to know that the connector 111 is set to operate as a time code input connector. The information A2 is information for notifying a user that the connector 111 can operate as a connector to input a time code signal. The information A2 includes at least one of image, voice, icon, and message. In step S607, both of the TC output switch 208 and the 75Ω terminal switch 205 are turned off. If the information A2 is displayed on the display unit 107, the flowchart ends.

In step S608, the control unit 108 turns on the 75Ω terminal switch 205 and causes the ATT switch 501 to select the passing side. This makes the Genlock signal input to the connector 111 ready to be supplied to the GL signal input unit 210. In other words, the connector 111 is set to operate as a Genlock input connector. While the 75Ω terminal switch 205 is ON, the connector 111 remains connected to the 75Ω terminal resistor 206. If the 75Ω terminal switch 205 is turned on and the ATT switch 501 selects the passing side, the control unit 108 proceeds from step S608 to step S609.

If the input signal input to the connector 111 from an external apparatus is a Genlock signal, the GL signal input unit 210 generates an external synchronization signal using the input signal supplied from the second amplitude limiter circuit 207. The external synchronization signal generated by the GL signal input unit 210 is supplied to the camera unit 101, the A/D converter 102, the video processing unit 103, the recording unit 104, and the control unit 108. The control unit 108 controls the camera unit 101, the A/D converter 102, the video processing unit 103, and the recording unit 104, according to the external synchronization signal generated by the TC signal input unit 209. As a result, the image capture apparatus 100 is able to generate a video signal synchronized with the external synchronization signal generated by the external apparatus, and to record the video signal on the recording medium 105.

In step S609, the control unit 108 causes the display unit 107 to display information A3 for notifying a user that the connector 111 is set to operate as a Genlock input connector. The notification allows the user to know that the connector 111 is set to operate as a Genlock input connector. The information A3 is information for notifying a user that the connector 111 can operate as a connector to input an external synchronization signal (e.g., a Genlock signal). The information A3 includes at least one of image, voice, icon, and message. If the information A3 is displayed on the display unit 107, the flowchart ends.

As described above, the image capture apparatus 100 according to the second exemplary embodiment is able to use one connector therein as one of a time code output connector, a time code input connector, and a Genlock input connector. The structure leads to further downsizing and cost reduction of the image capture apparatus 100. The structure also enables the image capture apparatus 100 to fit in a wide range of uses.

The image capture apparatus 100 according to the second exemplary embodiment automatically determines the type of an input signal to cause one connector to operate as a time code input connector or a Genlock input connector. This improves usability of the connector 111.

The input/output unit 112 according to the second exemplary embodiment is not limited to that illustrated in FIG. 5. For example, the input/output unit 112 may be configured without the capacitor 202, the resistor unit 203, the first amplitude limiter circuit 204, and the second amplitude limiter circuit 207. The connector 111 according to the second exemplary embodiment may be configured to operate only as an input connector.

Third Exemplary Embodiment

A third exemplary embodiment is described with reference to FIGS. 1 and 2, FIG. 5, and FIGS. 7 and 8. The third exemplary embodiment differs from the first and second exemplary embodiments in the input/output unit 112 as follows. The other parts of the third exemplary embodiment are similar to those of the first and second exemplary embodiments, and therefore the detail descriptions thereof will not be repeated.

The image capture apparatus 100 according to the third exemplary embodiment has the components illustrated in FIG. 1, and therefore the detail descriptions of these components will not be repeated.

Figure 7:
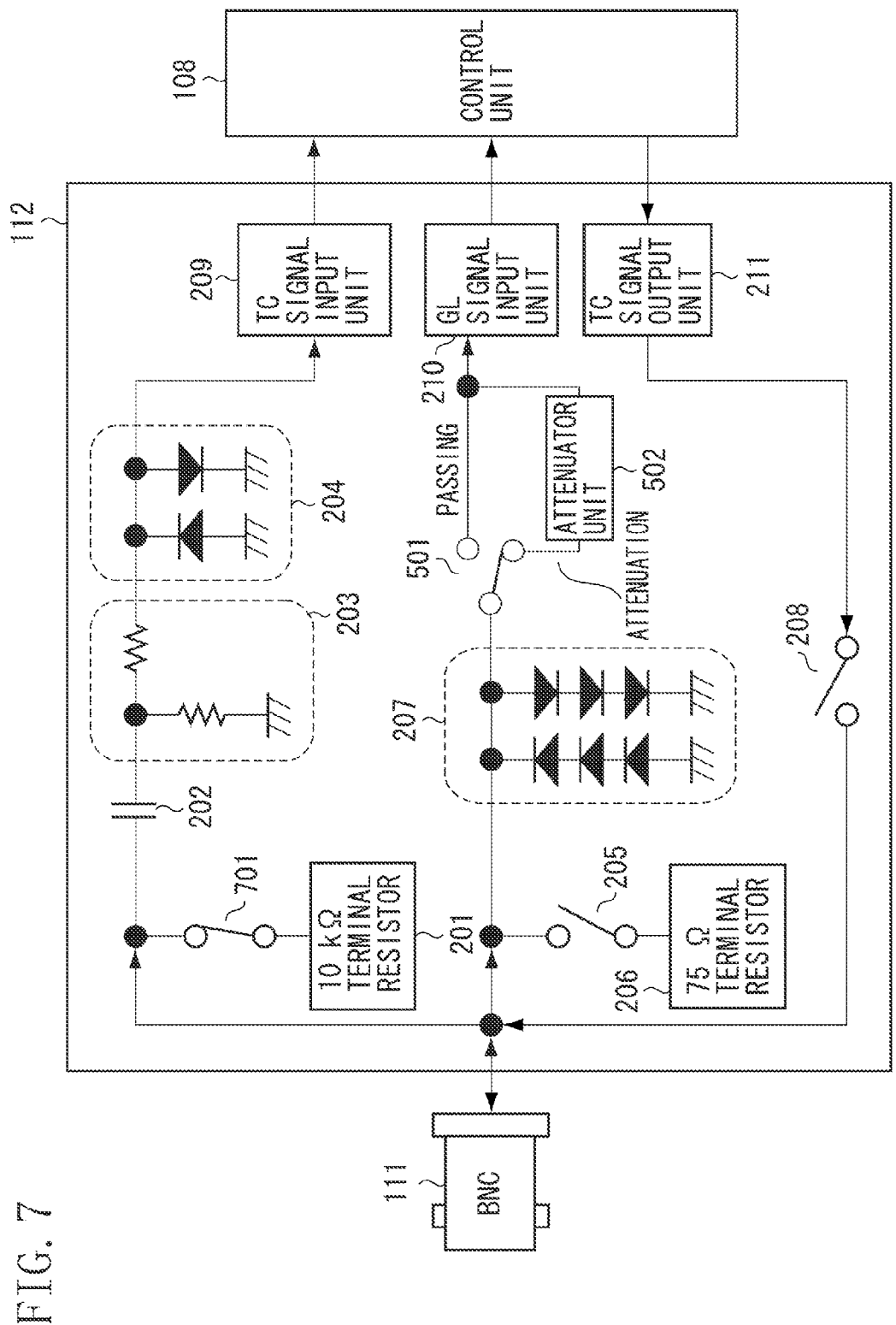
FIG. 7 illustrates components of the input/output unit according to the third exemplary embodiment.

FIG. 7 illustrates the components of the input/output unit 112 according to the third exemplary embodiment. In FIG. 7, the components similar to those in FIGS. 2 and 5 are designated with the same reference numerals as those in FIGS. 2 and 5, and therefore the detail descriptions of these components will not be repeated.

The input/output unit 112 according to the third exemplary embodiment includes a 10 kΩ terminal resistor 201, a capacitor 202, a resistor unit 203, and a first amplitude limiter circuit 204, as illustrated in FIG. 7. The input/output unit 112 according to the third exemplary embodiment further includes, as illustrated in FIG. 7, a 75Ω terminal switch 205, a 75Ω terminal resistor 206, a second amplitude limiter circuit 207, a TC output switch 208, a TC signal input unit 209, a GL signal input unit 210, a TC signal output unit 211, an attenuation (ATT) switch 501, an attenuator unit 502, and a 10 kΩ terminal switch 701.

The 10 kΩ terminal switch 701 controls a connection of the 10 kΩ terminal resistor 201. If the 10 kΩ terminal switch 701 is turned on, the 10 kΩ terminal switch 701 connects the kΩ terminal resistor 201 to the connector 111. While the kΩ terminal switch 701 is ON, the 10 kΩ terminal resistor 201 is connected to the connector 111. If the 10 kΩ terminal switch 701 is turned off, the 10 kΩ terminal switch 701 separates the 10 kΩ terminal resistor 201 from the connector 111. While the 10 kΩ terminal switch 701 is OFF, the 10 kΩ terminal resistor 201 is disconnected from the connector 111. The 10 kΩ terminal switch 701 operates as a second connection unit.

Figure 8:
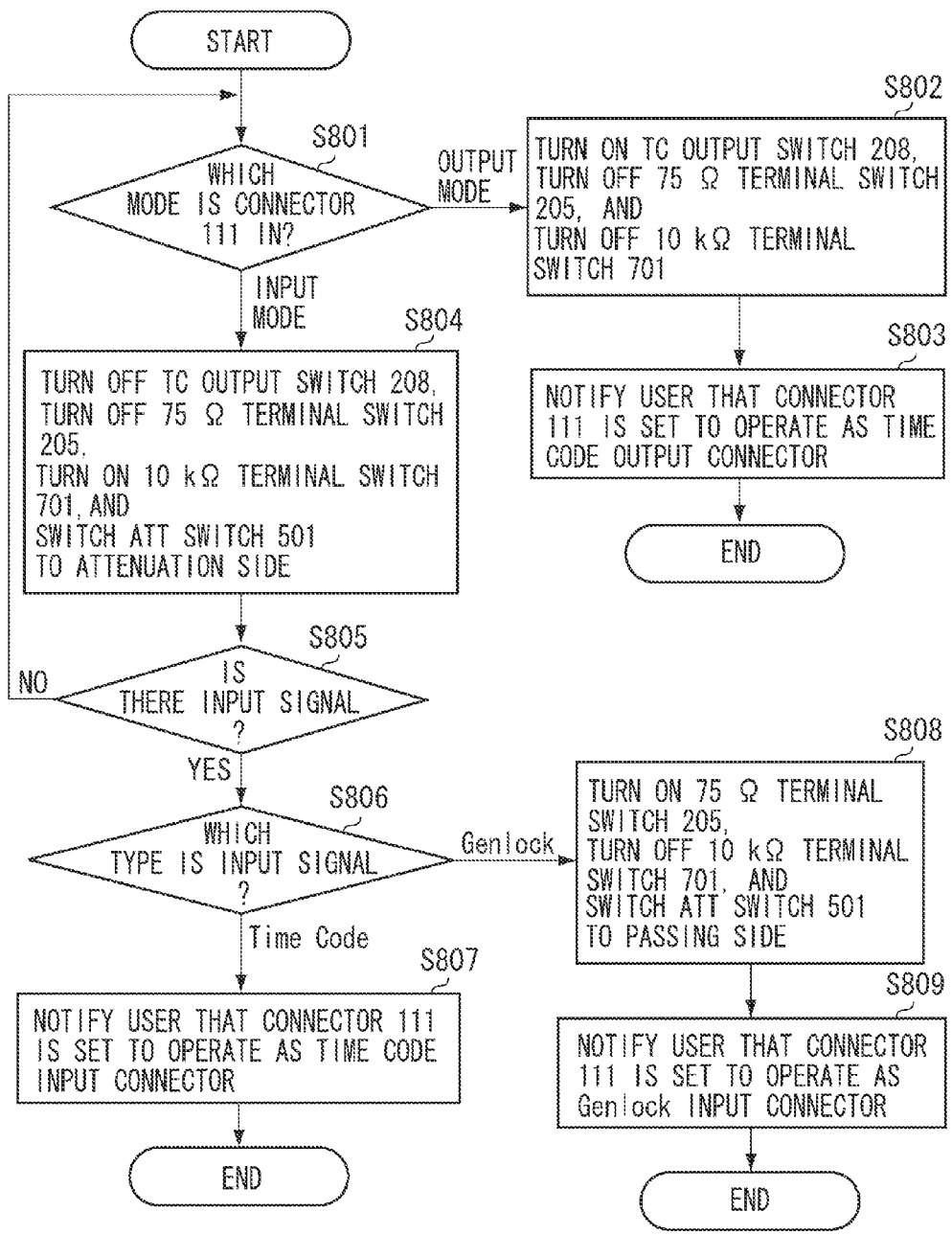
FIG. 8 is a flowchart illustrating an input/output control process performed in the image capture apparatus according to the third exemplary embodiment.

FIG. 8 is a flowchart illustrating an input/output control process performed in the image capture apparatus 100 according to the third exemplary embodiment. The input/output control process starts when the image capture apparatus 100 is turned on. Alternatively, the input/output control process starts when the connector 111 is updated to the input mode or the output mode. The input/output control process is controlled by the control unit 108. The program executed by the control unit 108 to control the input/output control process is stored in the program memory 110.

In step S801, the control unit 108 obtains connector mode information of the connector 111 from the memory 113, to check the current mode of the connector 111. The connector mode information indicates the current mode of the connector 111. If the connector mode information indicates that the connector 111 is in the output mode, the control unit 108 proceeds to step S802. If the connector mode information indicates that the connector 111 is in the input mode, the control unit 108 proceeds to step S804.

In step S802, the control unit 108 turns on the TC output switch 208 and turns off the 75Ω terminal switch 205 and the 10 kΩ terminal switch 701. This makes the connector 111 ready to output a time code signal. In other words, the connector 111 is set to operate as a time code output connector. While the 75Ω terminal switch 205 is OFF, the connector 111 remains disconnected from the 75Ω terminal resistor 206. While the 10 kΩ terminal switch 701 is OFF, the connector 111 remains disconnected from the 10 kΩ terminal resistor 201. If the TC output switch 208 is turned on and the 75Ω terminal switch 205 and the 10 kΩ terminal switch 701 are turned off, the control unit 108 proceeds from step S802 to step S803.

The time code generated by the control unit 108 while the connector 111 is in the output mode is supplied from the control unit 108 to the TC signal output unit 211. The TC signal output unit 211 generates a time code signal using the time code generated by the control unit 108. The time code signal generated by the TC signal output unit 211 is supplied to an external time code input apparatus via the TC output switch 208 and the connector 111.

In step S803, the control unit 108 causes the display unit 107 to display information A1 for notifying a user that the connector 111 is set to operate as a time code output connector. The information A1 indicates that the connector 111 can operate as a connector to output a time code signal. The notification allows the user to know that the connector 111 is set to operate as a connector to output a time code signal. The information A1 includes at least one of image, voice, icon, and message. If the information A1 is displayed on the display unit 107, the flowchart ends.

In step S804, the control unit 108 turns off the TC output switch 208 and the 75Ω terminal switch 205, turns on the 10 kΩ terminal switch 701, and causes the ATT switch 501 to select the attenuation side. This makes the connector 111 accept both of the time code signal and the Genlock signal from an external apparatus. In other words, the connector 111 is set to operate s a time code input connector also as a Genlock input connector while the TC output switch 208 and the 75Ω terminal switch 205 are OFF. While the 75Ω terminal switch 205 is OFF, the connector 111 remains disconnected from the 75Ω terminal resistor 206. While the 10 kΩ terminal switch 701 is ON, the connector 111 remains connected to the 10 kΩ terminal resistor 201. If the TC output switch 208 and the 75Ω terminal switch 205 are turned off, the 10 kΩ terminal switch 701 is turned on, and the ATT switch 501 selects the attenuation side, the control unit 108 proceeds from step S804 to step S805.

In step S805, the control unit 108 determines whether the connector 111 has received an input signal. If the control unit 108 determines the connector 111 has received an input signal (YES in step S805), the control unit 108 proceeds to step S806. If the control unit 108 determines the connector 111 has not received an input signal (NO in step S805), the control unit 108 returns to step S801.

The input signal received by the connector 111 while the TC output switch 208 and the 75Ω terminal switch 205 are OFF is supplied via the capacitor 202 and the resistor unit 203 to the first amplitude limiter circuit 204, and is processed there. The processed signal is input to the TC signal input unit 209. The TC signal input unit 209 checks the voltage of the input signal for a predetermined period of time to determine the type of the input signal. After the determination of the type, the TC signal input unit 209 supplies the type information of the input signal to the control unit 108. The information indicates whether the input signal received by the connector 111 is a time code signal or a Genlock signal.

In step S806, the control unit 108 checks the type information of the input signal supplied from the TC signal input unit 209, and determines the type of the input signal input from the external apparatus to the connector 111. If the input signal is determined to be a time code signal, the control unit 108 proceeds to step S807. If the input signal is determined to be a Genlock signal, the control unit 108 proceeds to step S808.

If the input signal input from an external apparatus to the connector 111 is a time code signal, the TC signal input unit 209 generates a time code using the input signal supplied from the first amplitude limiter circuit 204. The time code generated by the TC signal input unit 209 is supplied to the control unit 108. The control unit 108 performs control such that the time code generated by the TC signal input unit 209 is added to the video signal generated by the image capture apparatus 100. Consequently, the time code generated by the external apparatus is added to the video signal generated by the image capture apparatus 100, and is then recorded on the recording medium 105.

In step S807, the control unit 108 causes the display unit 107 to display information A2 for notifying a user that the connector 111 is set to operate as a time code input connector. The notification allows the user to know that the connector 111 is set to operate as a time code input connector. The information A2 is information for notifying a user that the connector 111 can operate as a connector to input a time code signal. The information A2 includes at least one of image, voice, icon, and message. In step S807, both of the TC output switch 208 and the 75Ω terminal switch 205 are turned off. If the information A2 is displayed on the display unit 107, the flowchart ends.

In step S808, the control unit 108 turns on the 75Ω terminal switch 205, turns off the 10 kΩ terminal switch 701, and causes the ATT switch 501 to select the passing side. This makes the Genlock signal input to the connector 111 ready to be supplied to the GL signal input unit 210. In other words, the connector 111 is set to operate as a Genlock input connector. While the 75Ω terminal switch 205 is ON, the connector 111 remains connected to the 75Ω terminal resistor 206. While the kΩ terminal switch 701 is OFF, the connector 111 remains disconnected from the 10 kΩ terminal resistor 201. If the 75Ω terminal switch 205 is turned on, the 10 kΩ terminal switch 701 is turned off, and the ATT switch 501 selects the passing side, the control unit 108 proceeds from step S808 to step S809.

If the input signal input to the connector 111 from an external apparatus is a Genlock signal, the GL signal input unit 210 generates an external synchronization signal using the input signal supplied from the second amplitude limiter circuit 207. The external synchronization signal generated by the GL signal input unit 210 is supplied to the camera unit 101, the A/D converter 102, the video processing unit 103, the recording unit 104, and the control unit 108. The control unit 108 controls the camera unit 101, the A/D converter 102, the video processing unit 103, and the recording unit 104, according to the external synchronization signal generated by the TC signal input unit 209. As a result, the image capture apparatus 100 is able to generate a video signal synchronized with the external synchronization signal generated by the external apparatus, and to record the video signal on the recording medium 105.

In step S809, the control unit 108 causes the display unit 107 to display information A3 for notifying a user that the connector 111 is set to operate as a Genlock input connector. The notification allows the user to know that the connector 111 is set to operate as a Genlock input connector. The information A3 is information for notifying a user that the connector 111 can operate as a connector to input an external synchronization signal (e.g., a Genlock signal). The information A3 includes at least one of image, voice, icon, and message. If the information A3 is displayed on the display unit 107, the flowchart ends.

As described above, the image capture apparatus 100 according to the third exemplary embodiment is able to use one connector therein to operate as one of a time code output connector, a time code input connector, and a Genlock input connector. The structure leads to further downsizing and cost reduction of the image capture apparatus 100. The structure also enables the image capture apparatus 100 to fit in a wide range of uses.

The image capture apparatus 100 according to the third exemplary embodiment automatically determines the type of an input signal to cause one connector to operate as a time code input connector or a Genlock input connector. This improves usability of the connector 111.

The image capture apparatus 100 according to the third exemplary embodiment is able to control a connection of the 10 kΩ terminal resistor 201 and a connection of the 75Ω terminal resistor 206 according to the type of the input signal. This can reduce deformation of the waveform of input signals. In addition, the image capture apparatus 100 according to the third exemplary embodiment can connect the terminal resistors in the descending order of the resistance values thereof. This configuration appropriately protects the input/output unit 112.

The input/output unit 112 according to the third exemplary embodiment is not limited to that illustrated in FIG. 7. For example, the input/output unit 112 may be configured without the capacitor 202, the resistor unit 203, the first amplitude limiter circuit 204, and the second amplitude limiter circuit 207. The connector 111 according to the third exemplary embodiment may be configured to operate only as an input connector.

Fourth Exemplary Embodiment

The functions and processes described in the first to third exemplary embodiments can be executed by a personal computer, a micro computer, or a central processing unit (CPU) using programs. Hereinafter, in a fourth exemplary embodiment of the present invention, the personal computer, micro computer, and CPU are collectively called "computer". In the fourth exemplary embodiment, the programs that are used to control the computer and execute the functions and processes described in the first to third exemplary embodiments are called "predetermined program".

The functions and processes described in the first to third exemplary embodiments are achieved when the computer executes the predetermined program. In this case, the predetermined program is supplied to the computer via a computer-readable recording medium. Examples of the computer-readable recording medium according to the fourth exemplary embodiment include a hard disk drive, an optical disc, a CD-ROM, a CD-R, a memory card, a read only memory (ROM), a random access memory (RAM). The computer-readable recording medium according to the fourth exemplary embodiment is a non-transitory recording medium.

While the present invention has been described with reference to the above exemplary embodiments, it is to be understood that the present invention is not limited to the disclosed exemplary embodiments. The scope of the following claims is to be accorded the broadest interpretation so as to encompass all modifications and equivalent structures.

This application claims priority from Japanese Patent Application No. 2010-192391 filed Aug. 30, 2010, which is hereby incorporated by reference herein in its entirety.

What is claimed is:

1. An image capture apparatus, comprising:
a connector;
a first terminal resistor having a first resistance value;
a second terminal resistor having a second resistance value which is smaller than the first resistance value; and
a connection unit configured (a) to disconnect the second terminal resistor from the connector if a time code signal is input to the connector, and (b) to connect the second terminal resistor to the connector if an external synchronization signal is input to the connector.

2. The image capture apparatus according to claim 1, further comprising:
a display unit, wherein if the time code signal is input to the connector and the first terminal resistor is disconnected from the connector, the display unit displays information for notifying a user that the connector operates as a connector to input a time code signal.

3. The image capture apparatus according to claim 1, further comprising:
a display unit, wherein if the external synchronization signal is input to the connector and the first terminal resistor is connected to the connector, the display unit displays information for notifying a user that the connector operates as a connector to input an external synchronization signal.

4. The image capture apparatus according to claim 1, further comprising:
a display unit, wherein if the time code signal is input to the connector and the first terminal resistor is disconnected from the connector, the display unit displays information for notifying a user that the connector operates as a connector to input a time code signal, and
wherein if the external synchronization signal is input to the connector and the first terminal resistor is connected to the connector, the display unit displays information for notifying a user that the connector operates as a connector to input an external synchronization signal.

5. The image capture apparatus according to claim 1, further comprising:
a second connection unit configured (a) to connect the first terminal resistor to the connector if the time code signal is input to the connector, and (b) to disconnect the first terminal resistor from the connector if the external synchronization signal is input to the connector.

6. The image capture apparatus according to claim 1, wherein the connector includes a BNC (Bayonet Neill Concelman) connector.

7. The image capture apparatus according to claim 1, wherein the time code signal is used to generate a time code for a video signal.

8. The image capture apparatus according to claim 1, wherein the time code signal includes a signal conformed to SMPTE (Society of Motion Picture and Television Engineers) 12M.

9. The image capture apparatus according to claim 1, wherein the external synchronization signal is used to synchronize a video signal generated by the image capture apparatus with a video signal generated by an external apparatus.

10. The image capture apparatus according to claim 1, wherein the external synchronization signal includes a Genlock (Generator lock) signal.

11. The image capture apparatus according to claim 1, wherein the image capture apparatus includes a digital video camera.

12. The image capture apparatus according to claim 1, wherein the image capture apparatus includes one of a digital camera, a mobile phone, and a mobile terminal.

13. The image capture apparatus according to claim 1, further comprising:
a time code signal generating unit configured to generate a time code signal,
wherein the time code signal generated by the time code signal generating unit is supplied to the connector if the connector is in an output mode.

14. The image capture apparatus according to claim 1, further comprising:
a display unit, wherein if the connector is in an output mode and the first terminal resistor is disconnected from the connector, the display unit displays information for notifying a user that the connector operates as a connector to output a time code signal.

15. The image capture apparatus according to claim 1, further comprising:
a display unit, wherein if the time code signal is input to the connector and the first terminal resistor is disconnected from the connector, the display unit displays information for notifying a user that the connector operates as a connector to input a time code signal, and
wherein if the connector is in an output mode and the first terminal resistor is disconnected from the connector, the display unit displays information for notifying a user that the connector operates as a connector to output a time code signal.

16. The image capture apparatus according to claim 1, further comprising:
a display unit, wherein if the external synchronization signal is input to the connector and the first terminal resistor is connected to the connector, the display unit displays information for notifying a user that the connector operates as a connector to input an external synchronization signal, and wherein if the connector is in an output mode and the first terminal resistor is disconnected from the connector, the display unit displays information for notifying a user that the connector operates as a connector to output a time code signal.

17. The image capture apparatus according to claim 1, further comprising:
a display unit, wherein if the time code signal is input to the connector and the first terminal resistor is disconnected from the connector, the display unit displays information for notifying a user that the connector operates as a connector to input a time code signal, wherein if the external synchronization signal is input to the connector and the first terminal resistor is connected to the connector, the display unit displays information for notifying a user that the connector operates as a connector to input an external synchronization signal, and
wherein if the connector is in an output mode and the first terminal resistor is disconnected from the connector, the display unit displays information for notifying a user that the connector operates as a connector to output a time code signal.

* * * * *